United States Patent
Sportelli

(10) Patent No.: US 10,486,557 B2
(45) Date of Patent: Nov. 26, 2019

(54) DEVICE FOR LONGITUDINAL MOVEMENT AND ADJUSTMENT OF AUTOMOTIVE VEHICLES SEATS

(71) Applicant: Aethra Sistemas Automotivos S/A, Betim (BR)

(72) Inventor: Pietro Sportelli, Betim (BR)

(73) Assignee: AETHRA SISTEMAS AUTOMOTIVOS S/A, Betim (BR)

( * ) Notice: Subject to any disclaimer, the term of this patent is extended or adjusted under 35 U.S.C. 154(b) by 0 days.

(21) Appl. No.: 15/913,200

(22) Filed: Mar. 6, 2018

(65) Prior Publication Data

US 2018/0290564 A1 Oct. 11, 2018

(30) Foreign Application Priority Data

Apr. 5, 2017 (BR) .............................. 102017006962

(51) Int. Cl.
*B60N 2/08* (2006.01)
*B60N 2/07* (2006.01)

(52) U.S. Cl.
CPC ........... *B60N 2/0818* (2013.01); *B60N 2/072* (2013.01); *B60N 2/0705* (2013.01); *B60N 2/0727* (2013.01); *B60N 2/085* (2013.01); *B60N 2/0831* (2013.01); *B60N 2/0881* (2013.01); *B60Y 2304/01* (2013.01); *B60Y 2304/03* (2013.01)

(58) Field of Classification Search
CPC .. B60N 2/0722; B60N 2/0818; B60N 2/0705; B60N 2/0727; B60N 2/0831; B60N 2304/01; B60N 2304/03; B60N 2/0843; B60N 2/0715; B60N 2/067; B60N 2/02; B60N 2/04; B60N 2/06; B60N 2/01508; B60N 2/01516; B60N 2/08; B60N 2/0806; B60N 2/0825; B60N 2/085; B60N 2/0837; B60N 2/075
USPC .............. 248/424, 425, 429, 430; 269/65.13, 269/65.14, 65.15
See application file for complete search history.

(56) References Cited

U.S. PATENT DOCUMENTS

| | | | | |
|---|---|---|---|---|
| 5,842,383 A * | 12/1998 | Yamada | ................. | B60N 2/071 74/528 |
| 6,036,157 A * | 3/2000 | Baroin | ................. | B60N 2/0705 248/429 |
| 7,066,521 B2 * | 6/2006 | Jung | ..................... | B60N 2/0705 248/430 |
| 8,215,602 B2 * | 7/2012 | Walter | ................. | B60N 2/0705 248/424 |
| 8,251,336 B2 * | 8/2012 | Kimura | ................ | B60N 2/0705 248/424 |

(Continued)

*Primary Examiner* — Muhammad Ijaz
(74) *Attorney, Agent, or Firm* — B. Aaron Schulman, Esq.; Stites & Harbison, PLLC

(57) ABSTRACT

A device that enables the correct ergonomic adjustment, by means of preset longitudinal positions, of the advancement and retreat of the motor vehicles seats, to guarantee comfort and safety of the driver as well as of the passengers. The device is made up by two rails (special and differentiated profiles), the upper rail (1) having a flat base (10) with flaps at tangent arcs (11 to 15) and the lower base (2) having tangential curved flaps (21 to 27), being fit and inserted in the inner spaces of the flaps by bearing balls (3). It further includes stops (16 and 28) of longitudinal movement and a position lock (4) activated by a bi-articulated mechanism (5) through a tubular lever (6), with vertical activation.

6 Claims, 5 Drawing Sheets

(56) References Cited

U.S. PATENT DOCUMENTS

| | | | |
|---|---|---|---|
| 9,327,616 B2* | 5/2016 | Hoshihara | B60N 2/0856 |
| 9,511,686 B2* | 12/2016 | Garotte | B60N 2/073 |
| 9,566,878 B2* | 2/2017 | Couasnon | B60N 2/0705 |
| 2002/0060281 A1* | 5/2002 | Okazaki | B60N 2/0705 248/424 |
| 2008/0231101 A1* | 9/2008 | Sakakibara | B60N 2/0705 297/344.1 |
| 2011/0163217 A1* | 7/2011 | Kimura | B60N 2/0705 248/429 |
| 2012/0006963 A1* | 1/2012 | Yoshida | B60N 2/0705 248/429 |
| 2012/0132777 A1* | 5/2012 | Nakamura | B60N 2/0705 248/429 |
| 2012/0132778 A1* | 5/2012 | Nakamura | B60N 2/0705 248/429 |
| 2012/0145866 A1* | 6/2012 | Fukuda | B60N 2/0705 248/429 |
| 2012/0318948 A1* | 12/2012 | Yamada | B60N 2/0727 248/429 |
| 2013/0206952 A1* | 8/2013 | Yamada | B60N 2/0722 248/429 |
| 2013/0214112 A1* | 8/2013 | Kawamura | B60N 2/08 248/429 |
| 2013/0341479 A1* | 12/2013 | Yamada | B60N 2/0722 248/430 |
| 2014/0138510 A1* | 5/2014 | Yamada | B60N 2/0705 248/429 |
| 2014/0145054 A1* | 5/2014 | Yamada | B60N 2/0705 248/429 |
| 2014/0231610 A1* | 8/2014 | Hoshihara | B60N 2/0705 248/430 |
| 2014/0239140 A1* | 8/2014 | Yamada | B60N 2/07 248/429 |

* cited by examiner

DEVICE FOR LONGITUDINAL MOVEMENT AND ADJUSTMENT OF AUTOMOTIVE VEHICLES SEATS

FIELD OF THE INVENTION

The present patent, which refers to the auto parts industry, is for a device that enables the correct ergonomic adjustment by preset longitudinal advancement and retreat positions of automotive vehicles seats, thus guaranteeing comfort and safety of the driver as well as of the passengers.

BACKGROUND OF THE INVENTION

The fixing and correct positioning of the seats in automotive vehicles are generally carried out by means of assemblies formed by two parts, the first one being a metal profile that slides longitudinally along lubricated ball bearings over the second one, also a metallic profile. Said parts, fixed to the seat and to the floor by means of screws, which behave concomitantly as interconnected sliding rails, which are hereinafter referred to as respectively upper rail and lower rail.

These sliding rails show cutouts for the seat of the cogs of a position lock which ensures fixation of the assembly in a given position, keeping it unchanged for preservation of the occupants' physical integrity in the event of an impact. Said lock, which the user activates by a lever, through a movement transfer mechanism maintains the chosen locking position until the longitudinal movement of the assembly is released.

However, in the current state of the art, this type of device is still too massive and heavy, presenting flaws such as: the ball bearings arrangement relative to the rail contact surface, which is improperly positioned thereon, thereby generating excessively high lateral loads that result in the accentuated wear of the roller tracks, a fact that is responsible not only for the deterioration of the track but also because of the increased rolling resistance when the seat is moved forward or backward; the activation mechanism of the position lock is generally disposed externally, causing the lever to occupy a larger space close to the rails.

These faults, in which the angle defined by the ball bearing arrangement in the models currently produced by the industry is the major drawback because it allows most of the vertical loading applied onto the rails to be discharged laterally exposing them to premature wear, are further emphasized by the fact that the rail sliding is normally limited by stops contained in the rail structure, requiring a differentiation in the way of accommodation of the profiles so as not to absorb an extra function that often detracts from its ideal performance, because the addition of extra mass causes, in certain cases, a decreased mechanical resistance of the assembly.

SUMMARY OF THE INVENTION

This invention presents a device for longitudinal movement of motor vehicles seats in which the sliding of the ball bearing tracks has been optimized, improving the discharge of the load on the ball bearings in order to thus provide greater performance in resistance, rigidity, ease of sliding and operation, besides being compact and of reduced mass compared to the current state of the art.

It is a seat-moving device in which the contact of the ball bearings between the rails happens symmetrically with respect to the horizontal plane, that is, on two longitudinal lines generated by the presence of radii of curvature slightly smaller than the ball bearing radius, combined with neighboring radii greater than their radius, arranged on the upper and lower rail flaps. In this way, the array of ball bearing rows has a rolling angle approaching the right angle, drastically attenuating the uneven stresses that occur with the lateral load concentrations on rails and balls, thereby promoting less slip resistance and consequently a sensibly reduced wear of the rails, as well as lowering wear and resistance of the rails to the ball bearings, besides allowing an easy and correct ergonomic adjustment of the preset longitudinal positions of advance and retreat of the seats.

Such longitudinal position is secured by means of a position lock mounted inside the profile assembly, as well as cogs contained within the lower profile, which cross the lock cutouts when at rest. Said lock is activated by a bi-articulated mechanism, arranged in the upper profile, by a tubular lever of multidisciplinary functioning, with the aid of stops, to absorb the impact on the rails in the case of total retreat of the seat during the adjustment.

The device for longitudinal movement of automotive vehicles seats, object of this patent, can be better understood by reporting to the attached figures, which are a part of this descriptive report and contain numerical references together with the description of their technical features. These figures do not restrict their configuration as to their dimensions, proportions and possible types of inserted finishes nor the scope of their practical application.

DETAILED DESCRIPTION OF THE INVENTION

Figure 1:
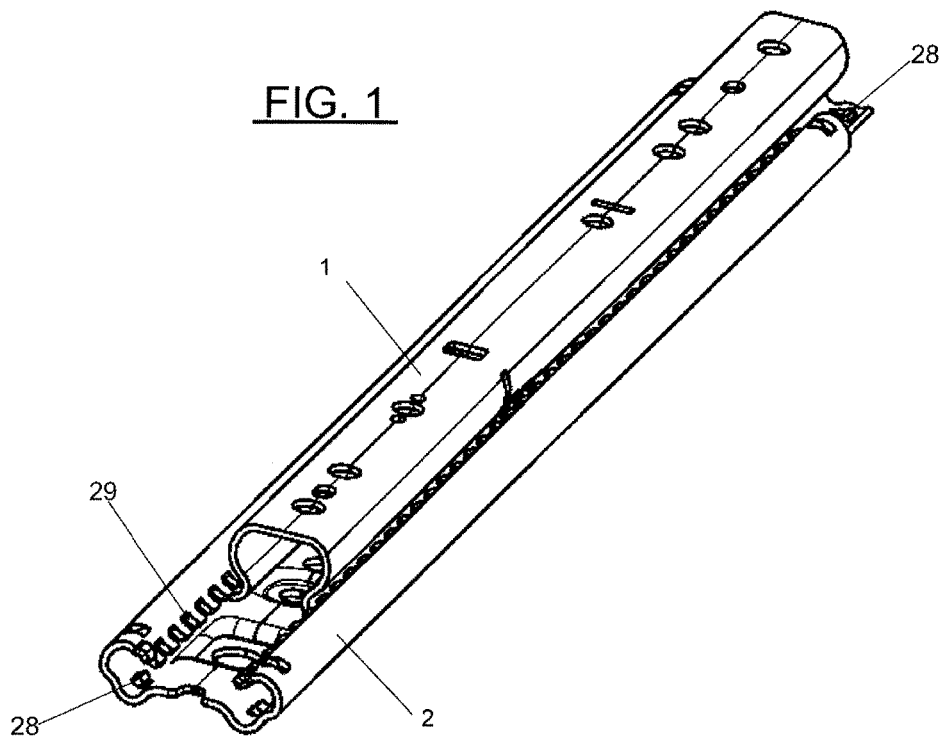
FIG. 1 is an isometric view of the seated rail assembly.
Figure 2:
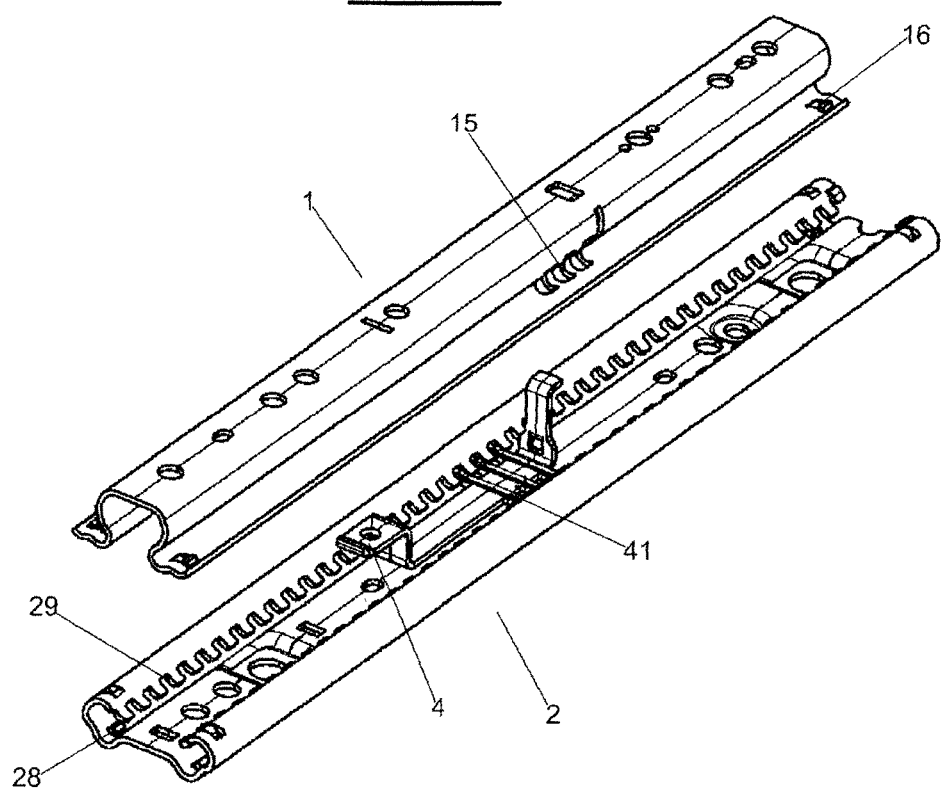
FIG. 2 is an exploded isometric view of the rail assembly.
Figure 3:
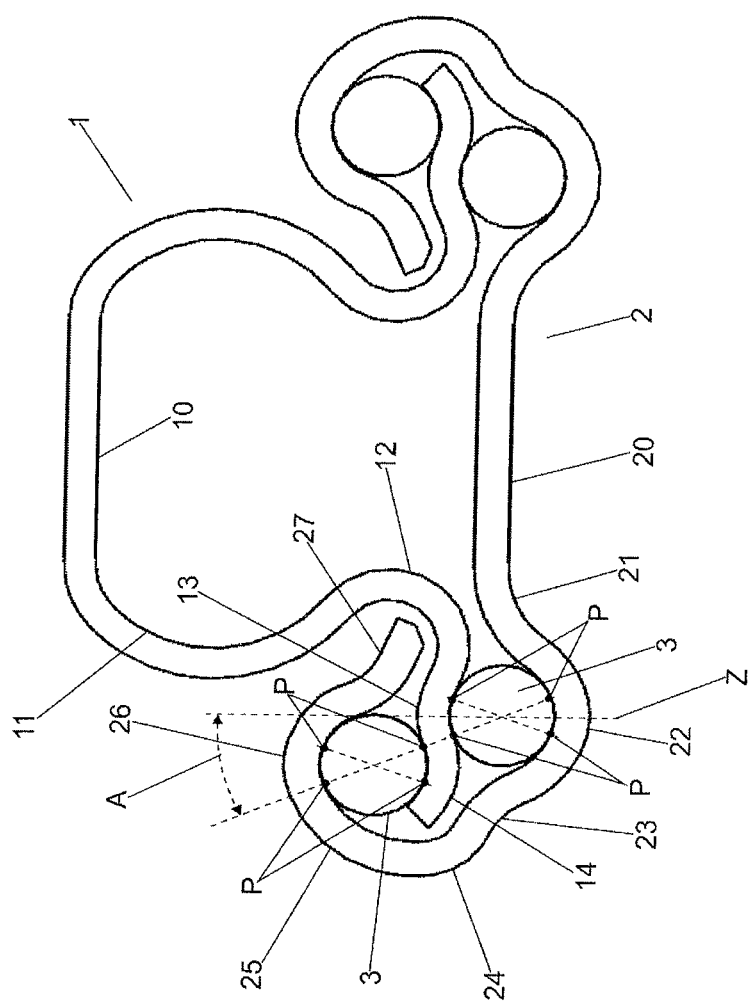
FIG. 3 is a cross-sectional view of the profile sections of the mounted assembly showing the contact points on which the ball bearings run and the 22.5° positioning angle of the ball bearings relative to the vertical load axis.
Figure 4:
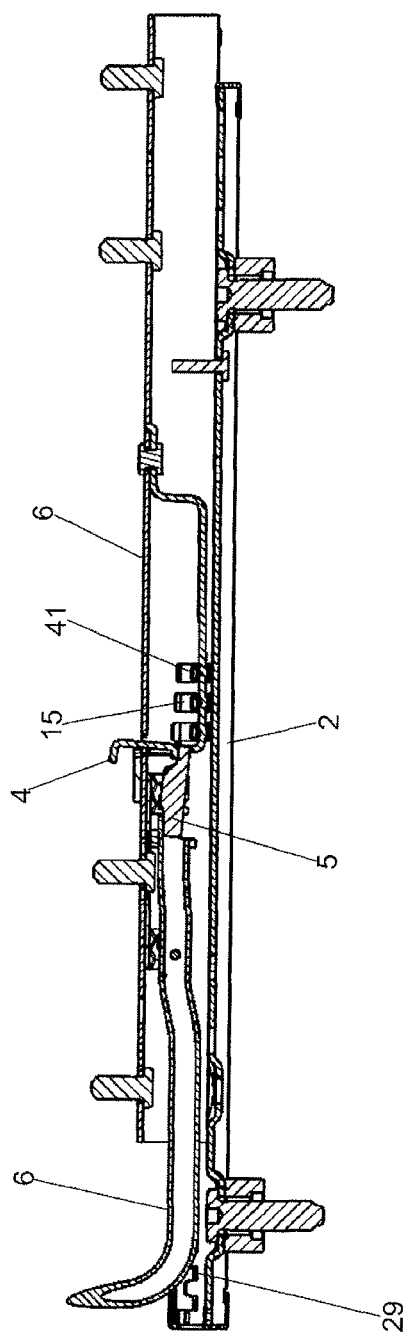
FIG. 4 is a longitudinal sectional view of the assembly showing the locks on the cutouts in the locked position.
Figure 5:
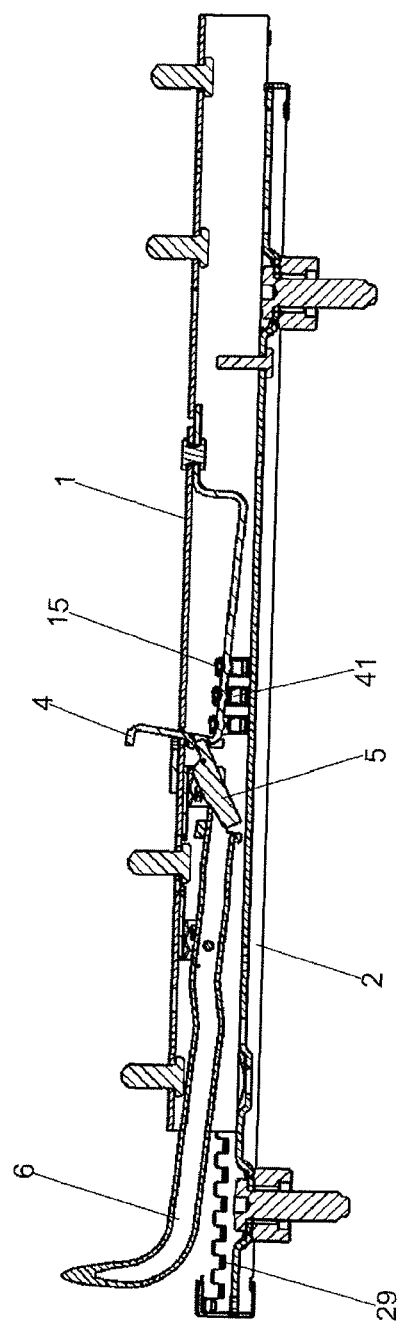
FIG. 5 is a longitudinal sectional view of the assembly showing the latches on the cutouts in the unlocked position.

According to these figures and their numerical references, this Invention describes a device for longitudinal moving of automotive vehicle front seats, consisting of one upper (1) and one lower (2) sinuous flap profile, fitted and separated by bearing balls (3) which, positioned between them, enable sliding one along the other so as to promote the advancement or retreat of the seat.

The upper (1) and lower (2) rails, the sections of which are special and differentiated, feature in the upper rail (1) section a flat base (10) for supporting and securing the seat, and tangential curved flaps (11 and 12), arranged in opposite directions and projected vertically, and then horizontally tangent to other smaller arcs (13 and 14) arranged in opposite directions; and in the lower rail (2) section a slightly raised flat base (20) for support and securement on the vehicle floor, and tangential curved flaps (21 and 22), also arranged in opposite directions and projected vertically, then projected in a sloping plane (approximately 45°) tangential to other smaller arcs (23, 24, 25, 26 and 27) arranged in opposite directions.

The rails (1 and 2) form the seat sliding assembly, the upper rail (1) being fit by its side flaps into the interior space of the side flaps of the lower rail (2). Such fitting has a row of bearing balls (3) interspersed in the inner spaces of the side flaps formed between the arcs (14 and 26) and another row of bearing balls (3) arranged in the inner spaces of the side flaps formed between the arcs (13 and 22).

This arrangement of the bearing balls (3) at an angle (A) of 22.5° to the support axis of the assembly ensures that the great majority of the vertical load is supported on the vertical axis (Z) with a small portion discharged horizontally. This small lateral load portion is sufficient to ensure self-alignment of the rails (1 and 2) while supporting the vertical majority load (P) arranged in the seat.

Thus, in addition to approaching the right angle, it drastically attenuates the uneven stresses that occur with the lateral load concentrations on the rails (1 and 2) and bearing balls (3), thereby promoting less resistance to slippage resulting in a significant reduction wear on the rails (1 and 2), besides lessening wear and resistance of the rails (1 and 2) on the bearings, further allowing the correct and easy ergonomic adjustment of the preset advancing and retreating positions of the seats.

This longitudinal position, limited by stops (16 and 28) disposed at the ends of the upper and lower rails (1 and 2), is secured by means of a position lock (4) assembled inside the upper rail (1), with cogs (41) crossing the surface of the position lock (6) and filling the cut-out spaces (29) in the lower rail (2) when at rest. The position lock (6) is activated through a bi-articulated mechanism (5) which is internal to the upper rail (1) by means of a tubular lever (6), with vertical activating. The upper rail (1) is fixed to the seat frame and the lower rail (2) is fixed to the vehicle floor.

In practice, the seat occupant, upon activating the lever (6), moves the bi-articulated mechanism (5), internal to the upper rail (1) and promotes the vertical displacement of the position lock (4), releasing it from the cut-out spaces (16) of the upper rail (1), thus allowing the relative sliding of the assembly, enabling the correct advance or retreat of the seat in order to obtain an ergonomic, comfortable and safe position for the occupant. By releasing the lever (6), the bi-articulated mechanism (5) returns the position lock (4) to the interior of the cutout spaces (29) of the lower rail (2), immobilizing the assembly.

The invention claimed is:

1. A device for longitudinal movement and adjustment of automotive vehicle seats, comprising:
    top and bottom sinuous rail sections, fitted and separated by bearing balls;
    the top rail section including an upper portion having a flat base having ends that are curved inwardly, an intermediate portion extending from the ends of said flat base, sad ends curving in opposite directions, and a lower portion extending from the lower ends of the intermediate portion wherein the ends of the lower portion extend in the opposite direction from the lower ends of the intermediate section;
    the bottom rail section having a slightly raised flat base and having tangential curved ends arranged in opposite directions and projecting outwardly and upwardly so as to form a channel wherein the lower portion of said top rail section fits, said curved ends extending outwardly beyond said ends of said lower portion of said top rail section;
    a first row of the bearing balls located between an uppermost portion of the curved ends of said bottom rail section and the lower portion of said top rail section and a second row of the bearing balls between a lowermost portion of the curved ends of said bottom rail section and the lower portion of said top rail section.

2. The device according to claim 1, wherein the arrangement of the bearing balls forms an angle sufficient to ensure a self-alignment of the top and bottom rails sections while supporting a major vertical load applied on the automotive vehicle seat during the longitudinal movement and adjustment.

3. The device according to claim 1, wherein the top and bottom rail sections form a seat sliding assembly, the top rail section being fitted by its intermediate and lower portions to an interior space formed by the curved ends of said bottom rail section.

4. The device according to claim 1, wherein longitudinal position of said device is limited by stops arranged at the ends of the top and bottom rail sections.

5. The device according to claim 1, wherein longitudinal position is secured using a position lock assembled inside the top rail section, and cogs which cross a surface of the position lock and fill cut-out spaces in the bottom rail section when at rest.

6. The device according to claim 5, wherein the position lock is activated by a bi-articulated mechanism internal to the top rail section by a tubular lever with vertical activation, and wherein the top rail section is fixable to a seat frame and the bottom rail section is fixable to the floor of an automotive vehicle including said device.

* * * * *